(12) United States Patent
Sims et al.

(10) Patent No.: US 8,687,392 B2
(45) Date of Patent: Apr. 1, 2014

(54) POWER CONVERTER WITH AUTOMATIC MODE SWITCHING

(75) Inventors: Nicholas A. Sims, San Francisco, CA (US); Jeffrey Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/424,033

(22) Filed: Mar. 19, 2012

(65) Prior Publication Data

US 2012/0176823 A1     Jul. 12, 2012

Related U.S. Application Data

(63) Continuation of application No. 12/370,488, filed on Feb. 12, 2009, now Pat. No. 8,164,932.

(51) Int. Cl.
   *H02M 7/17*   (2006.01)
   *H02M 7/12*   (2006.01)
   *H02M 3/335*  (2006.01)

(52) U.S. Cl.
   USPC ............ 363/69; 363/21.12; 363/84; 363/125; 363/146

(58) Field of Classification Search
   USPC ........... 363/21.04, 21.12, 69, 81, 84, 89, 125, 363/127, 146
   See application file for complete search history.

(56) References Cited

U.S. PATENT DOCUMENTS

| 5,610,450 | A  | 3/1997 | Saeki et al. |
|---|---|---|---|
| 5,612,609 | A  | 3/1997 | Choi |
| 5,642,267 | A  | 6/1997 | Brkovic et al. |
| 5,737,706 | A  | 4/1998 | Seazholtz et al. |
| 5,910,891 | A  | 6/1999 | Jo |
| 6,031,743 | A  | 2/2000 | Carpenter et al. |
| 6,208,118 | B1 | 3/2001 | Li |
| 6,215,288 | B1 | 4/2001 | Ramsey et al. |
| 6,246,592 | B1 | 6/2001 | Balogh et al. |
| 6,754,092 | B2 | 6/2004 | McDowell et al. |

(Continued)

FOREIGN PATENT DOCUMENTS

| CN | 101087101 | 12/2007 |
|---|---|---|
| JP | 61121773 | 6/1986 |

(Continued)

OTHER PUBLICATIONS

Terlizzi et al., U.S. Appl. No. 12/239,345, filed Sep. 26, 2008.

(Continued)

*Primary Examiner* — Adolf Berhane
*Assistant Examiner* — Fred E Finch, III
(74) *Attorney, Agent, or Firm* — Womble Carlyle Sandridge & Rice LLP

(57) ABSTRACT

A power converter is provided that has an alternating-current (AC) to direct-current (DC) switched-mode power converter circuit that converts alternating-current power into direct-current power for powering an attached electronic device. Power can be conserved by automatically placing the power converter circuit in a low-power standby mode of operation whenever the electronic device is detached from the power converter. A monitoring circuit can be powered by a capacitor or other energy storage element while the power converter is operating in the standby mode. If the monitoring circuit detects an output voltage change that is indicative of attachment of the electronic device or if the storage element needs to be replenished, the monitoring circuit can place the power converter circuit in an active mode of operation.

18 Claims, 13 Drawing Sheets

(56) References Cited

U.S. PATENT DOCUMENTS

| | | |
|---|---|---|
| 7,030,596 B1 | 4/2006 | Salerno et al. |
| 7,315,097 B2 | 1/2008 | Tajika |
| 7,411,317 B2 | 8/2008 | Liu |
| 7,478,254 B2 | 1/2009 | Kawai |
| 7,698,585 B2 | 4/2010 | Malik |
| 7,773,375 B1 | 8/2010 | Faucett |
| 7,852,645 B2 | 12/2010 | Fouquet |
| 8,164,932 B2 * | 4/2012 | Sims et al. ............... 363/69 |
| 2003/0084448 A1 | 5/2003 | Soundararajan |
| 2004/0001346 A1 | 1/2004 | McDowell et al. |
| 2005/0231042 A1 | 10/2005 | Kephart |
| 2007/0047270 A1 | 3/2007 | Makino et al. |
| 2007/0070558 A1 | 3/2007 | Liu |
| 2008/0088290 A1 | 4/2008 | So |
| 2008/0205102 A1 | 8/2008 | Makino |
| 2008/0285316 A1 | 11/2008 | Park et al. |
| 2009/0102294 A1 * | 4/2009 | Hodges et al. ............ 307/126 |
| 2010/0001684 A1 | 1/2010 | Eastlack |
| 2010/0164292 A1 | 7/2010 | Freeman |

FOREIGN PATENT DOCUMENTS

| | | |
|---|---|---|
| JP | H11252822 | 9/1999 |
| JP | 2001169540 | 6/2001 |
| JP | 2005218227 | 8/2005 |
| JP | 2005312162 | 11/2005 |
| JP | 2006280184 | 10/2006 |
| JP | 2008533971 | 8/2008 |
| JP | 4398505 | 1/2010 |
| KR | 100229604 | 11/1999 |

OTHER PUBLICATIONS

Notice of Preliminary Rejection; Korean Patent Application No. 10-2011-7019949, dated Jan. 30, 2013.

Japanese Application No. 2012-020279—Office Action dated Jul. 12, 2013.

Japanese Application No. 2012-020280—Office Action dated Jun. 28, 2013.

Korean Application No. 10-2013-7011163—Notice of Preliminary Rejection dated May 22, 2013.

Notification of the First Office Action in Chinese Application No. 200980156524.7, State Intellectual Property Office of the People's Republic of China, Aug. 14, 2013.

* cited by examiner

POWER CONVERTER WITH AUTOMATIC MODE SWITCHING

This patent application is a continuation of patent application Ser. No. 12/370,488, filed Feb. 12, 2009 now U.S. Pat. No. 8,164,932, which is hereby incorporated by reference herein in its entirety.

BACKGROUND

This relates to electronic devices and power converter circuits for electronic devices.

Alternating current (AC) power is typically supplied from wall outlets and is sometimes referred to as line power. Electronic devices include circuitry that runs from direct current (DC) power. Power converter circuitry is used to convert AC power to DC power. The DC power that is created in this way may be used to power an electronic device. The DC power that is created may also be used to charge a battery in an electronic device.

In some applications, AC to DC power converter circuitry may be incorporated into an electronic device. For example, desktop computers often include AC to DC power converter circuitry in the form of computer power supply units. A computer power supply unit has a socket that receives an AC power cord. With this type of arrangement, the AC power cord may be plugged directly into the rear of the computer to supply AC power without using an external power converter.

Although desktop computers are large enough to accommodate internal power supplies, other devices such as handheld electronic devices and portable computers are not. As a result, typical handheld electronic devices and laptop computers require the use of external power converters. When untethered from the power converter, a handheld electronic device or portable computer may be powered by an internal battery. When AC line power is available, the power converter is used to convert AC power into DC power for the electronic device.

Compact AC-DC power converter designs are typically based on switched-mode power supply architectures. Switched-mode power converters contain switches such as transistor-based switches that work in conjunction with energy storage components such as inductive and capacitive elements to regulate the production of DC power from an AC source. A feedback path may be used to tap into the converter output and thereby ensure that a desired DC voltage level is produced under varying loads.

High power converter efficiency is desirable for conserving power. High power conversion efficiency can be obtained by using efficient converter topologies and low-loss parts. Even when an optimal design is used, however, there are residual power losses when operating a power converter. These residual losses are associated with leakage currents and other parasitics that arise from running the switched-mode circuitry of the converter and lead to the consumption of power by the power converter even when the power converter is not being actively used to power an electronic device. Power consumption when the power converter is not being used to power an electronic device represents a source of undesirable power loss that can be reduced without adversely affecting converter functionality.

SUMMARY

A power converter may be provided that includes an energy storage circuit. The power converter may receive an input signal such as a line power signal and may produce a corresponding output signal such as a power signal for a device or other circuitry. The power converter may be placed in standby mode to conserve power. In standby mode, the energy storage circuit may be used to power circuitry that can wake the power converter from standby when appropriate. The power converter circuit can be provided as part of a stand-alone power adapter or may be incorporated into other electronic devices.

With one suitable arrangement, the power converter may be a power converter circuit such as an alternating-current (AC) to direct-current (DC) switched mode power converter circuit. The power converter circuit may convert AC line power into DC power for powering an attached electronic device. For example, the power converter may be used for powering an electronic device such as a cellular telephone, portable computer, or music player.

The power converter circuit may have a switch that is modulated to control power flow. When the switch is turned off, the power converter circuit is essentially shut down and will not produce a DC power at its output. In this state, which is sometimes referred to as a standby mode or sleep mode, power consumption by the power converter is minimized. When it is desired to power an attached electronic device, the power converter circuit may operate in an active mode in which the switch is actively modulated to produce a desired output signal (e.g., the DC output voltage).

The power converter circuit may provide its output to an output line through switching circuitry. During normal operation, a monitor circuit places the switching circuitry in a closed state in which the power converter circuit is coupled to the output line and produces a DC output voltage for powering the electronic device. Periodically, the monitor may open the switching circuitry to isolate the power converter circuit from the output line. The behavior of the voltage on the output line can be monitored by the monitor. In the presence of a load that draws power, the output line voltage will tend to sag. When driven by an internal boosting circuit with no load present, the output line voltage may rise (or may at least not fall past a given threshold). If the voltage on the output line rises (or does not fall past the given threshold), the monitor can conclude that the electronic device is detached from the power converter. If the voltage on the output line falls (or falls past the given threshold), the monitor can conclude that the electronic device is attached to the power converter.

The power converter may include an energy storage element such as a capacitor or battery. When the power converter circuit is operating in standby mode, the monitor can draw power from the energy storage element. This allows the monitor to actively monitor the state of the output line to automatically determine when an electronic device is reattached to the power converter. The monitor may also monitor the status of the energy storage element. If the energy storage element becomes depleted, the monitor can direct the power converter circuit to momentarily transition from the standby mode of operation to the active mode of operation to replenish the energy storage element. If a drop in the output line voltage is detected that is indicative of reattachment of the electronic device to the power converter, the monitor may activate the power converter circuit so that the electronic device is powered.

Further features of the invention, its nature and various advantages will be more apparent from the accompanying drawings and the following detailed description of the preferred embodiments.

DETAILED DESCRIPTION

Figure 1:
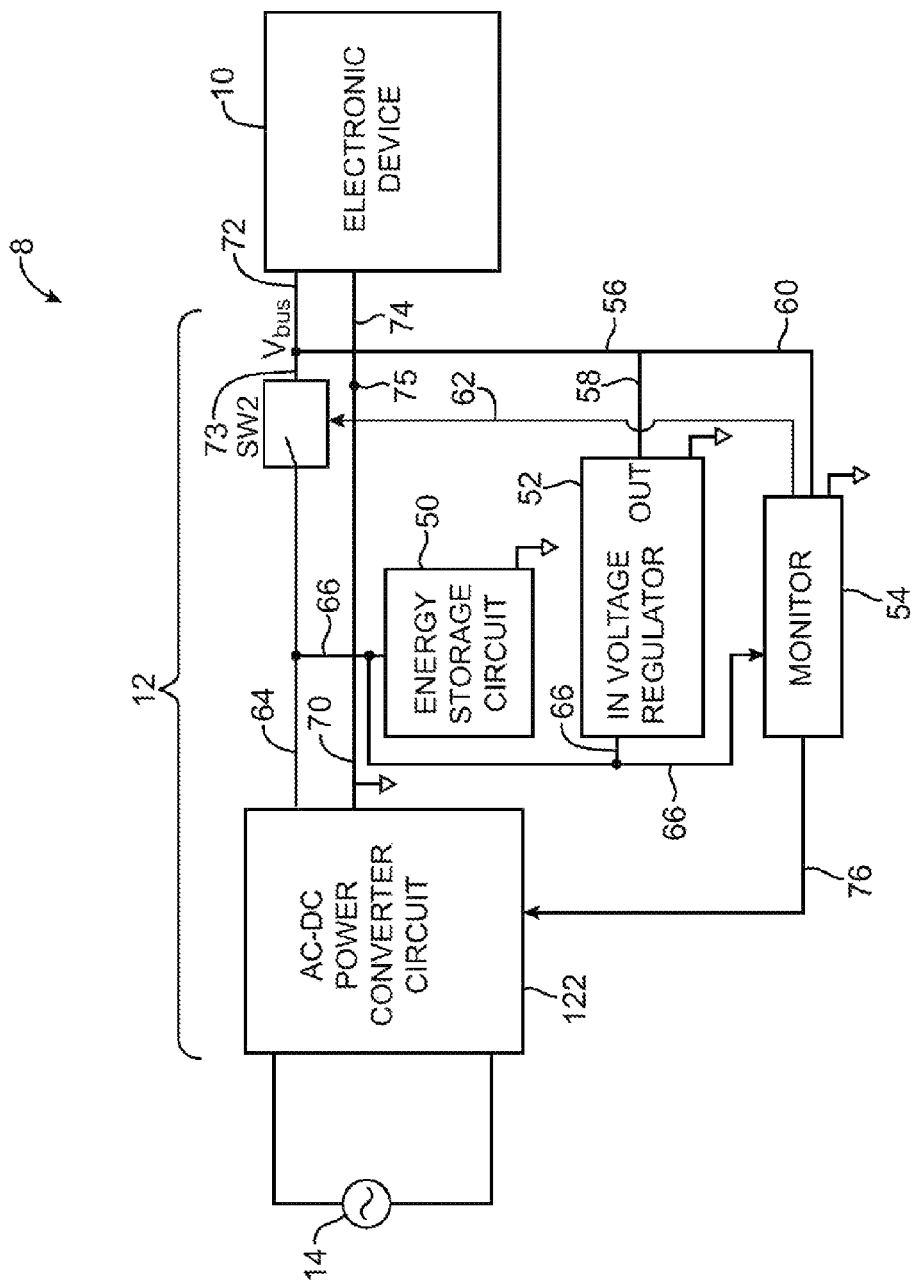
FIG. 1 is a circuit diagram of a system including a power converter and an electronic device in accordance with an embodiment of the present invention.

Power converters, which are sometimes referred to as power adapters, are used to convert power levels and types. For example, a power converter may be used to boost or reduce a direct-current (DC) power level. Power converters may also be used to convert alternating current (AC) power into DC power. Power converters that are used in converting AC power to DC power are sometimes described herein as an example. In general, however, power converter circuitry may include circuitry for transforming any suitable input signal (e.g., AC or DC currents and voltages) into any suitable output signal (e.g., boosted, reduced, or otherwise transformed AC or DC currents and voltages). The use of power converters such as AC-to-DC power converters that produce regulated DC output voltages from AC input signals is merely illustrative.

In a typical scenario, a power converter may be plugged into a source of AC line power such as a wall outlet. The AC power source may provide power at 120 volts or 240 volts (as examples). Circuitry in the power converter may convert the AC line power that is received into DC power. For example, an AC to DC power converter may receive AC line power at an input and may supply DC power at a corresponding output. The output voltage level may be 12 volts, 5 volts, or any other suitable DC output level.

The circuitry in the power converter may be based on a switched mode power supply architecture. Switched mode power supplies use switches such as metal-oxide-semiconductor power transistors and associated control schemes such as pulse-width modulation control schemes or frequency modulation control schemes to implement power conversion functions in relatively compact circuits. When the switching circuitry has a first configuration, power is transferred from a power source to a storage element such as an inductor (e.g., a transformer) or a capacitor. When the switching circuitry has a second configuration, power is released from the storage element into a load. Feedback may be used to regulate the power transfer operation and thereby ensure that the output voltage is maintained at a desired level. Examples of switched mode power supply topologies that may be used in a power converter include buck converters, boost converters, flyback converters, etc.

With one suitable arrangement, which is described herein as an example, an AC to DC power converter may be implemented using a voltage rectifier and flyback converter. The voltage rectifier converts AC line power into DC power at a relatively high voltage level. The flyback converter portion of the power converter steps down the DC power at the output of the rectifier circuit to 12 volts, 5 volts, or other suitably low level for operating circuitry in an electronic device. If desired, other power converter architectures may be used. The use of a switched mode power converter arrangement that is based on a flyback converter design is described herein as an example.

An AC to DC power converter may supply DC power to any suitable electronic device. Examples of an electronic device that may receive DC power from an AC to DC power converter include a handheld computer, a miniature or wearable device, a portable computer, a desktop computer, a router, an access point, a backup storage device with wireless communications capabilities, a mobile telephone, a music player, a remote control, a global positioning system device, and a device that combines the functions of one or more of these devices. With one suitable arrangement, which is sometimes described herein as an example, the electronic device that receives power from the AC to DC converter is a compact portable device such as a handheld electronic device (e.g., a mobile telephone or music player). This is, however, merely illustrative. The AC to DC power converter may be operated in conjunction with any suitable electronic device.

An illustrative system environment in which a power converter may provide power to an electronic device is shown in FIG. 1. As shown in FIG. 1, system 8 may include a source of AC power such as AC power source 14, a power converter such as AC to DC power converter 12, and an electronic device such as electronic device 10.

AC power source 14 may be, for example, a standard wall outlet that supplies AC line power via a power cord. Wall outlet power is typically delivered at AC voltages of about 110 volts to 240 volts.

Power converter 12 may include a power converter circuit such as AC-DC power converter circuit 122. AC-DC power converter circuit 122 may be based on a switched-mode power supply design such as a flyback converter or other suitable power converter topology.

Electronic device 10 may have a battery for use in powering device 10 when unattached to power converter 12. When power converter 12 is plugged into AC power source 14 and when electronic device 10 is connected to power converter 12, power converter 12 can transform AC power that is received from AC power source 14 into DC power for device 10.

If desired, connectors may be provided at the input and/or output of power converter 12. For example, device 10 may have a universal serial bus (USB) port into which a USB cable may be plugged. The USB cable may be used to convey DC power between power converter 12 and electronic device 10. For example, the USB cable or other cable may contain a first line such as positive power supply line 72 that is used to convey a positive DC voltage at 12 volts, 5 volts, or other suitable positive DC voltage level from converter 12 to device 10. This DC voltage level is sometimes referred to as Vbus and line 73 of converter 12 is sometimes referred to as a power supply bus or output line. The USB cable or other cable may also have a second line such as ground line 74 that is used to convey a ground voltage at 0 volts or other suitable ground voltage level to device 10. A cable such as a USB cable may also contain data lines that may optionally be used to convey information between device 10 and converter 12.

When connected to power converter 12, electronic device 10 may receive DC power through the power pins of the USB connector and cable (as an example). The use of a USB connector to connect power converter 12 and electronic device 10 is, however, merely illustrative. Any suitable plugs, jacks, ports, pins, other connectors, or a hardwired connection may be used to interconnect power converter 12 and electronic device 10 if desired. Similarly, a hardwired connection or a suitable plug, jack, port, pin structure, or other connector may be used to connect power converter 12 to power source 14.

AC-DC power converter circuit 122 may convert AC power from AC source 14 to DC power on output paths 64 and 70. Path 64 may be a positive power supply line that is coupled to converter output line 73 via switch SW2. Path 70 may be a ground power supply line that is coupled to ground output 75 of converter 12 and ground line 74 in the cable or other path connecting converter 12 to device 10. Switching circuitry such as switch SW2 may be based on any suitable electrical components that can control the flow of DC power from the output of AC-DC power converter circuit 122 to the power supply input lines associated with electronic device (e.g., the inputs of device 10 that are connected to power supply lines 72 and 74). For example, switching circuitry SW2 may be implemented using one or more transistors such as one or more power field-effect transistors (power FETs). During normal operation in which an electronic device such as electronic device 10 is connected to power converter 12, power converter 12 may use AC-DC power converter circuit 122 to supply a DC power supply voltage on lines 64 and 70. Switching circuitry SW2 will generally be closed during normal operation, so line 64 will be shorted to output line 73. This allows the DC power supply voltages at the output of AC-DC power converter circuit 122 to be provided to electronic device via paths 72 and 74.

AC-DC power converter circuit 122 may contain control circuitry for controlling internal switching circuits. The control circuitry may be responsive to feedback signals. For example, a feedback path may be used to supply AC-DC power converter circuit 122 with information on the current level of voltage Vbus on output line 73. In response to this feedback information, the control circuitry in AC-DC power converter circuit 122 can make real-time adjustments to the amount of DC voltage that is being supplied to the output of AC-DC power converter circuit. For example, if the DC voltage on output 64 has a nominal value Vsec of 5 volts and feedback indicates that the voltage has undesirably risen to 5.05 volts, the control circuitry in AC-DC power converter circuit 122 can make adjustments to lower the DC output voltage back to the nominal value (Vsec).

Power converter 12 may contain an energy storage circuit 50. Energy storage circuit 50 (sometimes also referred to as an energy storage element) may be based on any suitable circuitry for storing energy. As an example, energy storage circuit 50 may include one or more batteries, capacitors, etc. During operation of power converter 12 when AC-DC power converter circuit 122 is supplying power to output path 64, a path such as path 66 may be used to route power to energy storage circuit 50. The power that is routed to energy storage circuit 50 in this way may be used to replenish the battery, capacitor or other energy storage components in circuit 50. In the example of FIG. 1, energy storage circuit 50 is coupled to AC-DC power converter circuit 122 by paths 64 and 66. This is, however, merely illustrative. Any suitable routing paths may be used to supply replenishing power from AC-DC power converter circuit 122 to energy storage circuit 50 if desired.

As shown in FIG. 1, power converter 12 may include monitoring circuitry such as monitor 54. Monitor 54 may monitor the status of power converter 12 using paths such as paths 66 and 60. When appropriate, monitor 54 may provide control signals to AC-DC power converter circuit 122 using paths such as path 76. The control signals may be used to place AC-DC power converter circuit in an appropriate operating mode. In general, any suitable number of operating modes may be supported by AC-DC power converter circuit 122 if desired.

With one suitable arrangement, which is sometimes described herein as an example, AC-DC power converter circuit 122 may be placed in an active mode and a standby mode. In the active mode, which is sometimes also referred to as a high-power mode or normal operating mode, AC-DC power converter 122 is on and supplies DC output power for replenishing energy storage circuit 50 and for powering electronic device 10. In the standby mode, which is sometimes referred to as a sleep mode or low-power mode, AC-DC power converter circuit 122 is placed in a state in which little or no power is consumed by AC-DC power converter circuit 122 (i.e., AC-DC power converter circuit 122 is turned off by inhibiting modulation of its switched-mode power supply switches). If desired, AC-DC power converter circuit 122 may have multiple lower power states (e.g., a partly off state and a fully-off state). Arrangements in which AC-DC power converter 122 is placed in either a standby state or an active state are sometimes described herein as an example. This is, however, merely illustrative. Power converter 12 may, in general, support any suitable number of operating modes (e.g., a fully-on mode, a partly-on mode, a sleep mode, a deep sleep mode, etc.).

When AC-DC power converter circuit 122 is in standby mode, AC-DC power converter circuit 122 is off and allows output 64 to float. In this situation, the power that has been stored in energy storage circuit 50 may be delivered to path 66 from within energy storage circuit 50. For example, if energy storage circuit 50 contains a battery or a capacitor, the battery or capacitor may be used to supply a battery or capacitor voltage to path 66. The voltage supplied by energy storage circuit 50 may be supplied at the same voltage level as the nominal output voltage level (Vsec) that AC-DC power converter circuit 122 supplies to path 64 when AC-DC power converter circuit 122 is in active mode.

Voltage regulator 66 may receive the voltage supplied by energy storage circuit 50 via path 66 on its input IN and may supply a corresponding output voltage to output path 58 via its output OUT. In the absence of a load on output line 73, the voltage that voltage regulator 52 supplies to path 58 may be elevated with respect to Vsec (i.e., the voltage supplied by voltage regulator 52 to path 58 during standby operations may be equal to an elevated voltage Vaux that is larger than Vsec). If, for example, Vsec is 5.0 volts (as an example), Vaux may be 5.1 volts (as an example).

Output line 58 may be coupled to output line 73 and path 72 by path 56. During standby mode, monitor 54 may supply a switch control signal to switching circuitry SW2 via a path such as path 62. The control signal may place SW2 in an open mode in which lines 64 and 73 are electrically disconnected from each other. Disconnecting output line 73 from path 64 isolates output 73 from AC-DC power converter circuit 122 and energy storage circuit 50. The voltage that output line 73 assumes following the opening of switching circuitry SW2 by monitor 54 depends on the status of electronic device 10.

If electronic device 10 is disconnected from power converter 12 when switching circuitry SW2 opens, voltage regulator 52 will supply elevated voltage Vaux to output line 73 via paths 58 and 56, thereby driving Vbus to Vaux. If electronic device 10 is connected to power converter 12 when monitor 54 opens switching circuitry SW2, electronic device 10 will operate as a load and will draw power from voltage regulator output OUT via lines 58 and 56. Voltage regulator 52 may contain a current limiting circuit that ensures that voltage regulator 52 will only be able to supply a relatively modest amount of current to electronic device 10. As a result, the power draw from electronic device 10 will pull Vbus low.

Monitor 54 may determine the attachment status of electronic device 10 by monitoring the voltage Vbus on output line 73 via paths 56 and 60. If the monitor detects a rise in voltage Vbus when switching circuitry SW2 is opened, monitor 54 can conclude that electronic device 10 is currently detached from power converter 12. If monitor 54 detects a drop in voltage Vbus when switching circuitry SW2 is opened, monitor 54 can conclude that electronic device 10 is currently attached to power converter 12. Whenever monitor 54 determines that electronic device 10 is attached to power converter 12, monitor 54 may place AC-DC power converter circuit 122 in active mode to supply device 10 with power. If the presence of electronic device 10 is not detected, monitor may leave AC-DC power converter circuit in standby mode to conserve power. If monitor 54 detects that energy storage circuit 50 has become depleted due to prolonged operation in standby mode, monitor 54 may awaken AC-DC power converter circuit 122 momentarily to replenish energy storage circuit 50.

Figure 2:
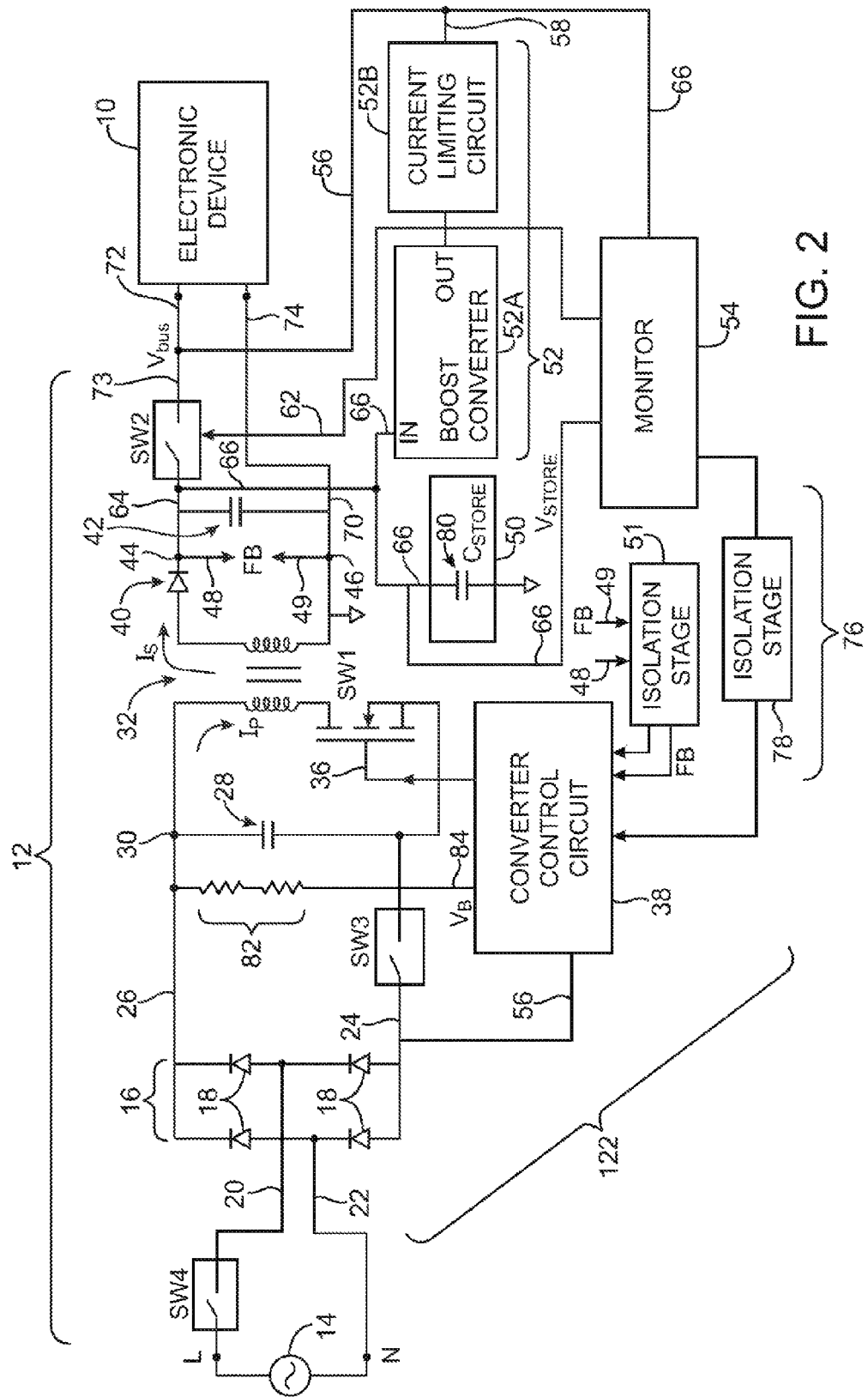
FIG. 2 is a circuit diagram showing illustrative components that may be used for a power converter of the type shown in the diagram of in FIG. 1 in accordance with an embodiment of the present invention.

Power converter 12 of FIG. 1 may be implemented using any suitable circuits. Illustrative circuitry that may be used in implementing power converter 12 is shown in FIG. 2. In the example of FIG. 2, power converter circuit 122 has been formed using a flyback switched-mode power supply design. This is, however, merely illustrative. Any suitable power converter circuitry may be used for AC-DC power converter circuit 122 if desired.

As shown in FIG. 2, AC source 14 may be coupled to power converter 12 at terminals L and N. AC power from terminals L and N may be supplied to paths 20 and 22.

Power converter 12 may have rectifier circuitry 16. Diodes 18 may convert AC voltages on paths 20 and 22 to rectified (positive) signals across lines 24 and 26. The AC voltage on paths 20 and 22 may be sinusoidal and the output of rectifier circuit 16 may be a rectified sinusoid. To smooth out the raw rectified output from diodes 18, power converter 12 may include capacitor 28. Capacitor 28, which may be considered to be part of rectifier 16, converts the rectified version of the AC signal from source 14 into a DC voltage on node 30 with a reduced amount of AC ripple.

AC-DC power converter circuit 122 may include a power converter control circuit such as converter control circuit 38. Ground line 56 may be used to connect converter control circuit to ground path 24. Positive power supply voltage Vb may be supplied to converter control circuit 38 at input 84. Input 84 may be provided with voltage Vb by tapping power supply line 26 using bleed circuit 82. Bleed circuit 82 may contain current limiting components such as one or more resistors.

Transformer 32 may have an input connected to the output of rectifier 16 and an output connected to diode 40 and capacitor 42. Transformer 32 may have a turn ratio such as a 10:1 or 20:1 turn ratio. Switching circuitry SW1 such as a bipolar or metal-oxide-semiconductor power transistor may be used to regulate the current Ip that flows through the primary side of transformer 32. Switch SW1 may receive a control signal on control input 36 from converter control circuit 38. The control signal may have a frequency of about 20 kHz to 100 kHz (as an example). Control circuit 38 may produce the control signal on line 36 to regulate the flow of power through converter 12. When power converter 12 is operated in active mode, the control signal is active and is changed as needed to regulate the magnitude of voltage Vbus. When power converter 12 is in standby mode, the control signal is inactive (i.e., there is no time-varying control signal present on line 36). This reduces power consumption in power converter 12 that would otherwise arise from the operation of switching circuitry SW1, even in the absence of a connected load on output line 73. Standby power consumption can be further reduced by opening optional switching circuitry such as switches SW3 and SW4 to reduce leakage currents (e.g., using control signals from converter control circuit 38 and/or from monitor 54).

The control signal that is provided to switching circuitry SW1 on line 36 may be a signal whose frequency is adjusted to control the amount of power that flows through the converter or may be a signal such as a pulse width modulation (PWM) signal whose duty cycle is adjusted to control the amount of power that flows through the converter in accordance with a pulse width modulation scheme.

With a typical PWM scheme, the control signal on line 36 may have a high value when it is desired to turn switch SW1 on to permit current Ip to flow and may have a low value when it is desired to turn switch SW1 off to prevent current Ip from flowing. The control signal on line 36 may, for example, be a square wave PWM signal whose duty cycle may be regulated by control circuit 38 to adjust the magnitude of Vbus on output 73. If desired, a frequency modulation scheme may be used. In a frequency modulation scheme, the control signal on line 36 may be a square wave or other control signal whose frequency is regulated by control circuit 38 to adjust the magnitude of voltage Vbus. The use of PWM control signals in power converters such as power converter 12 is sometimes described herein as an example. The use of PWM control signals is, however, merely illustrative. Any suitable type of control signal may be used to control power flow in converter 12 if desired.

When control circuit 38 applies a control signal such as a PWM control signal to switch SW1, the current Is at the secondary side of transformer 32 will have a frequency equal to that of the control signal (e.g., about 20 kHz to 100 kHz). Diode 40 and capacitor 42 convert this AC signal into a DC voltage at node 44. This voltage is provided to line 64 and represents the output of AC-DC power converter circuit 122 of FIG. 1. The nominal power supply output voltage on line 64, which is sometimes referred to herein as Vsec, may be, for example, 12 volts, 5 volts, or other suitable voltage. When electronic device 10 is connected to output line 73 during active mode, the voltage that is produced at output 64 may be routed to electronic device 10 through switching circuitry SW2, output 73, and path 72 to power the circuitry of electronic device 10.

Power converter 12 may be controlled using an open-loop control scheme. With this type of arrangement, power converter 12 can apply a predetermined PWM signal, frequency modulation signal, or other control signal to switching circuitry SW1 to produce a desired output level on output 64 and output line 73. If desired, a closed-loop control scheme may be used by providing a feedback path FB such as feedback path formed from lines 48 and 49. Using lines 48 and 49, control circuit 38 can receive feedback on the current voltage level across nodes 44 and 46 (i.e., the output voltage on line 64). If the currently monitored value of the output voltage on node 44 is below a desired target level (i.e., below the desired Vsec level), the duty cycle of the PWM signal or, in a frequency modulation scheme, the frequency of the control signal can be increased to increase the output voltage accordingly. If control circuit 38 determines that the output voltage on node 44 and output 64 of AC-DC power converter circuit 122 is too high, the duty cycle of the PWM signal or the frequency of the control signal can be decreased to reduce the output voltage towards its desired target level.

Circuitry such as converter control circuit 38 may be located on the primary side of transformer 32. Circuitry such as monitor circuitry 54, energy storage element 50, switching circuitry SW2, and voltage regulator 52 may be located on the secondary side of transformer 32. If desired, an isolation stage such as isolation stage 51 may be included in feedback path FB to help electrically isolate circuitry on the primary and secondary sides of transformer 32. Similarly, an isolation stage such as isolation stage 78 may be included in control path 76 between monitor 54 and converter control circuit 38. Isolation stages 51 and 78 may be formed from signal transformers, optical isolation devices, etc.

As shown in FIG. 2, energy storage circuit 50 may be formed from an energy storage element such as capacitor 80. Capacitor 80 may be coupled between path 66 and ground (e.g., node 46). During standby operations, capacitor 80 may be used to power monitor 54 and voltage regulator 52. Monitor 54 can monitor the output voltage from capacitor 80 on path 66 to determine when capacitor 80 has become depleted enough to warrant replenishment. When replenishment of the energy of capacitor 80 is desired, monitor 54 can issue a wake-up control signal to converter control circuit 38 via control path 76. In response, converter control circuit 38 can transition to active mode by resuming the generation of control signals on control line 36. This will lead to the production of a DC output voltage on line 64 that can be routed to capacitor 80 via path 66 to recharge capacitor 80. Battery-based energy storage elements may also be recharged in this way when they become depleted. An energy storage element 50 that is based on a battery may have, for example, a charger circuit connected between path 66 and the battery.

Voltage regulator circuit 52 may be formed from a DC-DC power converter such as a DC-DC boost converter 52A and a current limiting circuit such as current limiting circuit 52B. If desired, the current limiting capabilities of current limiting circuit 52B may be combined with the voltage regulating capabilities of power converter circuit 52A. In the example of FIG. 2, voltage regulation and current limiting functions have been implemented using separate circuits. This is merely illustrative. Circuits such as power converter 52A and 52B may be formed from one, two, or more than two integrated circuits and may, if desired, include discrete components.

Power converter 52A may be a switched-mode power supply such as a boost circuit formed from control circuitry (such as control circuit 38), storage elements (capacitors and/or inductors), and other components (e.g., diodes). Electrical components such as these may be implemented as part of a single integrated circuit. During operation, boost converter 52A may receive power (e.g., a DC voltage Vstore from capacitor 80) on input IN and may provide a corresponding output voltage on output OUT. The output voltage on output OUT of power converter 52A may be lower or higher than the voltage Vstore. In the example of FIG. 2, converter 52A is a boost converter that produces a nominal output voltage Vaux on output OUT that is greater than the nominal output voltage Vsec produced at output 64 of power converter circuit 122. If, for example, Vsec is 5.0 volts, Vaux may be 5.1 volts (as an example). The voltage Vstore may range from 5.0 volts when capacitor 80 is fully charged to a lower value (e.g., a voltage in the range of about 1-4.5 volts) as capacitor 80 becomes depleted.

Current limiting circuit 52B may be implemented using one or more resistors or other suitable circuitry for limiting the maximum amount of current that may be drawn from power converter 52A when a load is connected to output line 73.

When power converter circuit 122 is in standby mode, switch SW2 will be open. In the absence of a load on output line 73, current limiting circuit 52B can pass the voltage on output OUT of boost converter 52A to line 58 with negligible change in magnitude. In this situation, if the nominal output voltage from boost converter 52A is Vaux, the DC voltage Vbus on output line 73 will rise to Vaux.

When a load such as electronic device 10 is connected to power converter 12, the voltage Vbus on output line 73 will be pulled low. Boost converter 52A will not be able to maintain Vbus at Vaux in this situation, because current limiting circuit 52B serves to limit the amount of current that can be supplied to device 10. This causes voltage Vbus to sag under load.

Monitor 54 can therefore monitor the attachment status of electronic device 10 by measuring the voltage Vbus and observing changes that take place in Vbus while controlling switching circuitry SW2.

Figure 3:
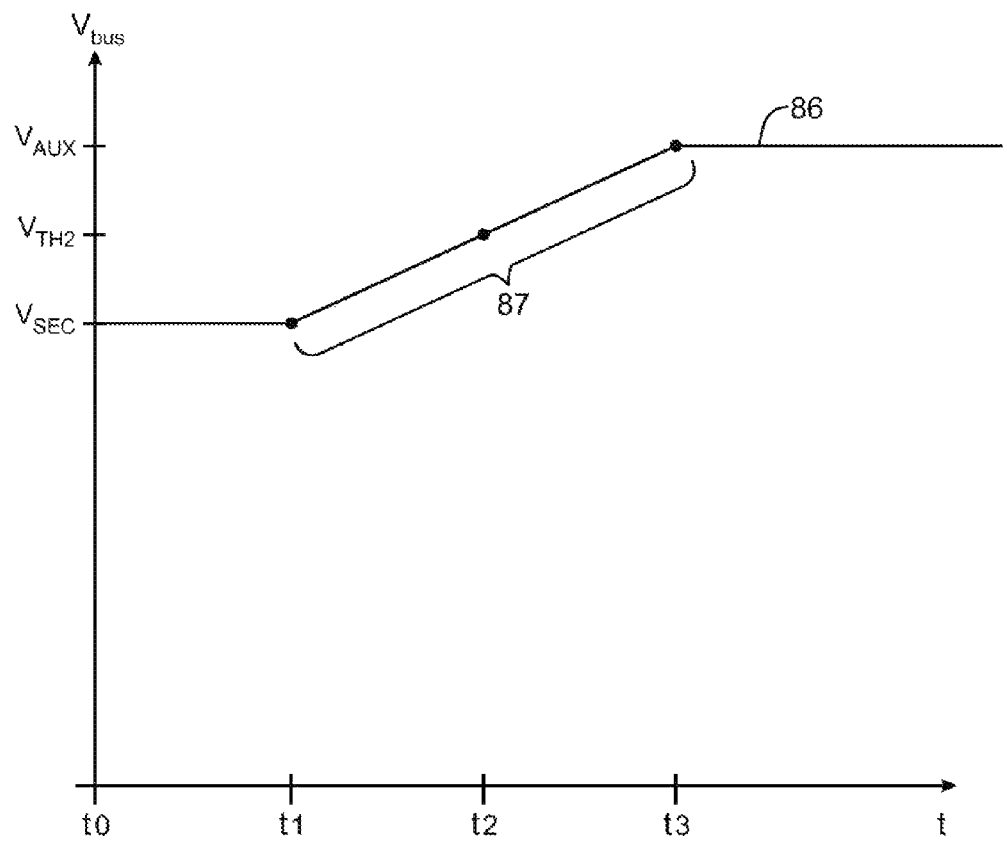
FIG. 3 is a graph showing how the output voltage from a power converter of the type shown in FIG. 2 may evolve when an electronic device is detached from the power converter in accordance with an embodiment of the present invention.

FIG. 3 shows how the voltage Vbus on output line 73 may evolve when a user detaches electronic device from power converter 12. At times before t0, electronic device 10 is attached to power converter 12 and receives DC power over lines 72 and 74. Power converter circuitry 122 is in its active mode and supplies a DC output voltage at nominal output voltage Vsec on output 64. Switching circuitry SW2 is closed during active mode, so the voltage Vsec on output 64 of power converter circuit 122 is passed to power converter output line 73. The voltage Vbus on line 73 is therefore equal to Vsec at times before t0. At time t0, the user detaches electronic device 10 from output line 73. Because output line 73 is connected to output 64, which is supplying voltage Vsec, voltage Vbus remains at voltage Vsec. At time t1, monitor 54 opens switching circuitry SW2 to isolate output line 73 from power converter circuit 122. Monitor 54 may open switching circuitry SW2 in this way once every few seconds or minutes or at other suitable times to check the attachment status of electronic device 10.

At times after time t0, electronic device 10 is no longer attached to output line 73. As a result, when switching circuitry SW2 is opened at time t1, electronic device 10 no longer supplies a load to output line 73. This allows Vbus to rise to the level of voltage Vaux that is supplied at output OUT of voltage regulator 52, as indicated by sloping segment 87 of curve 86. Monitor 54 can monitor this rise in voltage Vbus using path 60. When a predefined threshold voltage such as threshold voltage Vth2 is reached at time t2, monitor 54 can conclude that electronic device 10 has been removed from power converter 12. Monitor 54 can therefore issue a power-down command to power converter circuit 122 over control path 76 to place AC-DC power converter circuit 122 and power converter 12 into a standby power consumption mode. In this mode, switching circuit SW2 remains open, so voltage Vbus may rise to Vaux at times t between times t2 and t3.

Figure 4:
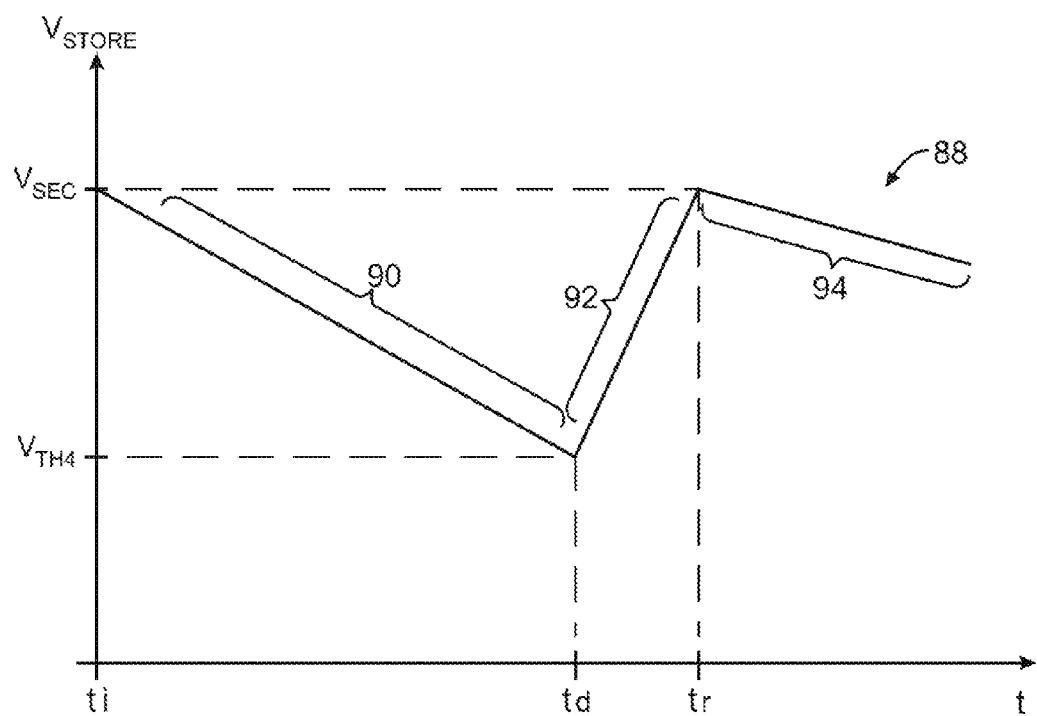
FIG. 4 is a graph showing how the voltage on an energy storage element in a power converter of the type shown in FIG. 2 may evolve during standby mode operations and energy replenishment operations in accordance with an embodiment of the present invention.

Line 88 in the graph of FIG. 4 illustrates how the voltage Vstore on path 66 at the output of capacitor 80 may evolve as a function of time when electronic device 10 is detached from power converter 12. At time ti, power converter 12 is in standby mode. In standby mode, power converter circuit 122 is off (i.e., not actively switching switch SW1) and monitor 54 is being powered by stored energy in capacitor 80. Initially, at time ti, capacitor 80 has a voltage Vstore of Vsec (i.e., the nominal output voltage on output 64 that is produced by power converter circuit 122 when power converter circuit 122 is active).

During times ti to td, monitor 54 operates to detect changes in the attachment status of electronic device 10. This consumes power and depletes capacitor 80, leading to the decrease in voltage Vstore from Vsec to Vth4, as indicated by curve segment 90.

At time td, Vstore drops below a predetermined threshold voltage Vth4. When monitor 54 detects that Vstore has dropped below Vth4, monitor 54 may issue an activation control command on path 76 that turns on power converter circuit 122. Once power converter circuit 122 is placed in active mode at time td, the output voltage on output 64 will rise to nominal output value Vsec, as indicated by line segment 92 of curve 88.

Monitor 54 can monitor the replenishment process represented by line segment 92 to confirm when Vstore has returned to its fully replenished state or can direct power converter circuit 122 to remain active for a given period of time (e.g., a period such as a few seconds that is sufficient to recharge capacitor 80). At time tr, after capacitor 80 has been replenished, monitor 54 can place power converter circuit 122 in standby mode. As indicated by line segment 94, the depletion process of line segment 90 then repeats. Monitor 54 can turn power converter circuit 122 on and off as shown in FIG. 4 for as long as required (i.e., until electronic device 10 is attached).

Figure 5:
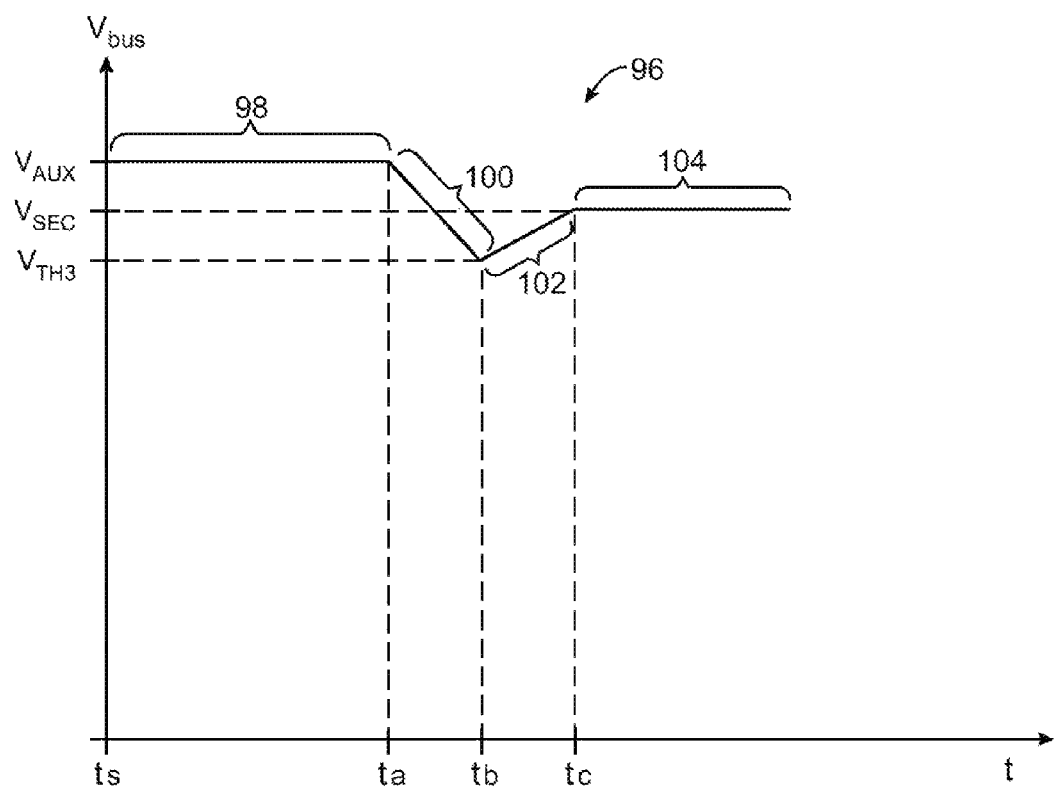
FIG. 5 is a graph showing how the output voltage from a power converter of the type shown in FIG. 2 may evolve when an electronic device is attached to the power converter in accordance with an embodiment of the present invention.

The graph of FIG. 5 illustrates how voltage Vbus may evolve during the process of attaching electronic device 10 to power converter 12. At time ts, electronic device 10 is not attached to power converter 12. In the absence of a load on output line 73, the voltage Vbus rises to Vaux to match the unloaded output voltage of voltage regulator 54, as shown by line segment 98 of curve 96. At time ta, a user attaches electronic device 10 to power converter 12 (e.g., by connecting a USB cable or other cable between device 10 and power converter 12). Once device 10 is connected to output line 73, device 10 begins to load output line 73.

Current limiting circuit 52B prevents voltage regulator 52 from providing the full amount of current that is demanded by electronic device 10. This causes voltage Vbus to drop from Vaux at time ta to a predetermined threshold voltage such as Vth3 at time tb, as indicated by line segment 100. When monitor 54 detects that voltage Vbus has dropped to Vth3, monitor 54 can conclude that electronic device 10 has been attached to power converter 12. Monitor 54 can therefore issue a command to power converter circuit 122 over path 76 that places power converter circuit 122 in its active mode.

Once power converter circuit 122 is activated, the output voltage from power converter circuit 122 can supply power to electronic device 10, allowing voltage Vbus to rise to its nominal value Vsec, as indicated by line segment 102 in FIG. 5. At times after time tc (e.g., along line segment 104), Vbus may be held at voltage Vsec by converter control circuit 38.

Figure 6:
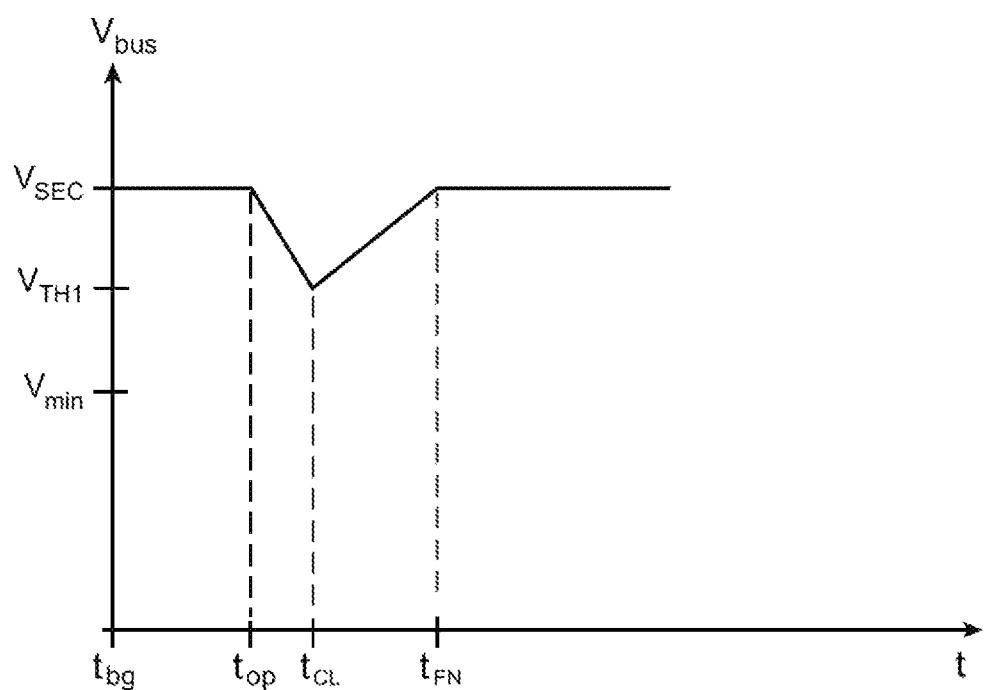
FIG. 6 is a graph showing how the output voltage from a power converter of the type shown in FIG. 2 may evolve during a monitoring operation as an electronic device that is being powered by the power converter remains attached to the power converter in accordance with an embodiment of the present invention.

FIG. 6 shows how Vbus may evolve when monitor 54 opens switching circuitry SW2 while electronic device 10 remains attached. At time tbg, power converter 12 is active and is powering electronic device 10 by supplying a voltage Vbus of Vsec. At time top, monitor 54 opens switching circuitry SW2. Because electronic device 10 is connected to power converter 12, voltage Vbus drops. When a predetermined threshold voltage Vth1 is reached at time tc1, monitor 54 can conclude that electronic device 10 is still connected to power converter 12 and can close switching circuitry SW2. Voltage Vbus preferably remains above voltage Vmin (e.g., about 4.5 volts) to prevent electronic device 10 from erroneously concluding that electronic device 10 has been disconnected from power converter 12. Once switching circuitry SW2 is closed, power is restored to output line 73 and voltage Vbus will rise, reaching nominal output voltage level Vsec at time tfn.

Figure 7:
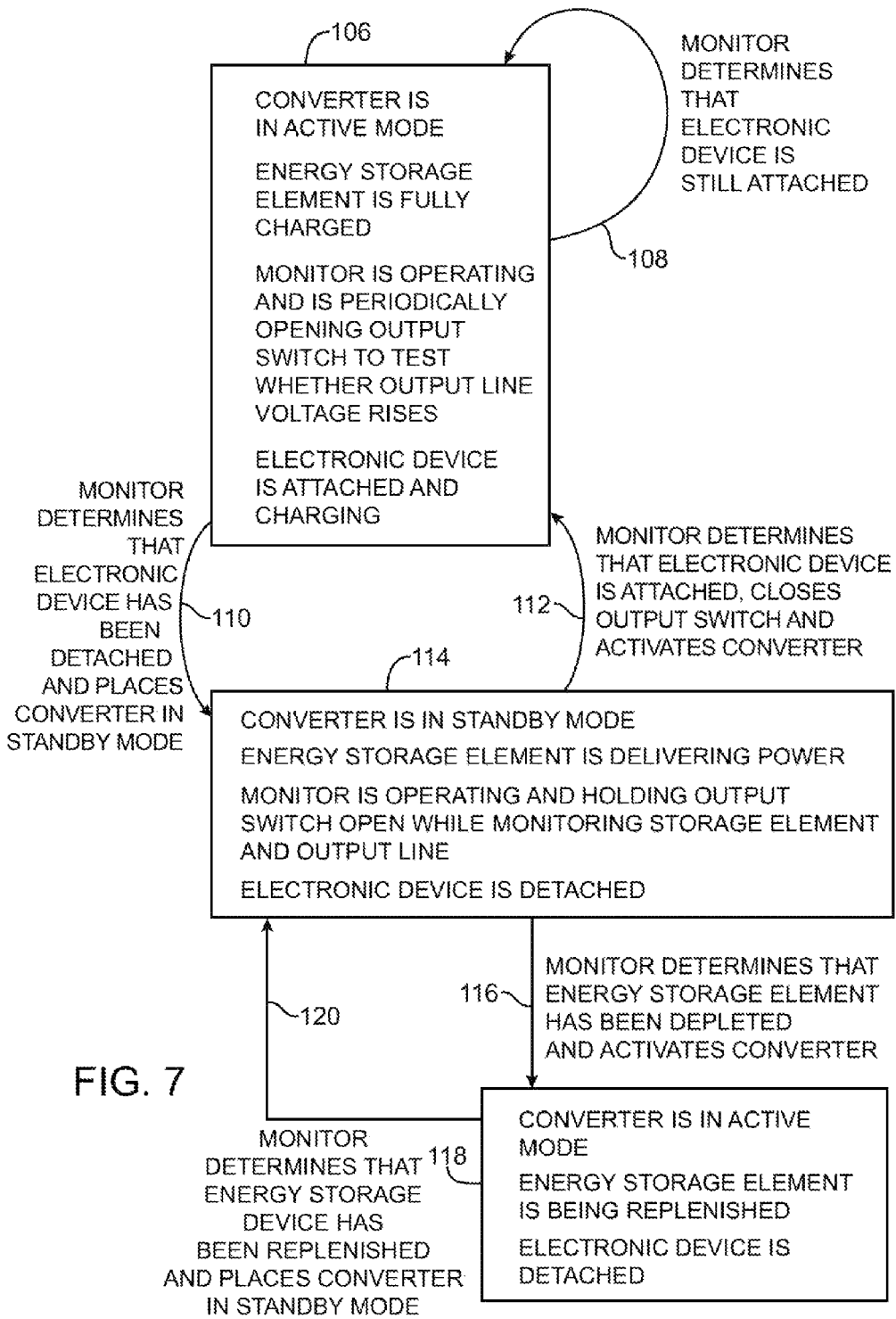
FIG. 7 is a diagram showing illustrative operating modes and operations involved in transitioning between operating modes in a power converter of the type shown in FIG. 2 in accordance with an embodiment of the present invention.

A diagram showing how power converter 12 and device 10 may operate in system 8 of FIG. 1 as a user attaches and detaches device 10 from converter 12 is shown in FIG. 7.

In active mode 106, power converter 12 is operating normally as an AC-DC power converter and is supplying power to an attached electronic device 10 from AC source 14. In a typical scenario, electronic device 10 contains a rechargeable battery that can be recharged when electronic device 10 is connected to power converter 12. During the operations of mode 106, monitor 54 primarily holds switching circuitry SW2 closed to allow power to be delivered from line 64 to output line 73 and electronic device 10. At appropriate times (e.g., once every few seconds, minutes, etc.), monitor 54 momentarily opens switching circuitry SW2 to check whether electronic device 10 is still attached. If voltage Vbus does not rise when switching circuitry SW2 is opened (e.g., if voltage Vbus falls to Vth1 as described in connection with FIG. 6), monitor 54 can conclude that electronic device 10 is still attached to power converter 12. As indicated by line 108, the operations of active mode 106 can then continue uninterrupted.

If, however, voltage Vbus rises to threshold Vth2 when switching circuitry SW2 is opened as described in connection with FIG. 3, monitor 54 can conclude that device 10 has been detached. As shown by line 110, monitor 54 can then place power converter circuit 122 and power converter 12 in standby mode 114.

During standby mode 114, power converter circuit 122 is not active, so power converter circuit 122 is not able to deliver power for powering monitor 54. Rather, power is supplied from energy storage circuit 50. In particular, energy storage circuit 50 may supply a voltage Vstore to monitor 54 and to input IN of boost converter 52A (FIG. 2). So long as the voltage level of voltage Vstore is sufficient (i.e., above Vth4), energy storage circuit 50 can be used to power monitoring circuit 54 and voltage regulator 52. During this time, monitor 54 may periodically check the attachment status of electronic device 10. If voltage Vbus falls below Vth3 during one of these checks as described in connection with FIG. 5, monitor 54 can return power converter circuit 122 and power converter 12 to active mode 106, as indicated by line 112. If monitor 54 determines the voltage Vstore falls below Vth4 as described in connection with FIG. 4, monitor 54 can momentarily activate power converter circuit 122 (active mode 118). In active mode 118, power converter circuit 122 is active and replenishes energy storage element 50 (e.g., by recharging capacitor 80 path 66). Device 10 remains detached during the operations of mode 118.

After voltage Vstore has been restored (line segment 92 of FIG. 4), monitor 54 may return power converter circuit 122 and power converter 12 to standby mode 144 to conserve power, as indicated by line 120.

If desired, Vaux can be provided at a different level (e.g., a level that is greater than the minimum operating voltage of device 10 or other such load but that is not greater than Vsec). In the example of FIGS. 4, 5, 6, and 7, the use of a Vaux value that is greater than Vsec helps facilitate the detection of the attachment state of device 10 when opening of switch SW2. In scenarios in which Vaux is not greater than Vsec, the presence of device 10 or other such loads may be detected by determining that the voltage Vbus has not fallen (e.g., Vbus has not fallen past a particular threshold voltage). Configurations in which Vaux is greater than Vsec are sometimes described herein as an example. This is, however, merely illustrative.

Figure 8:
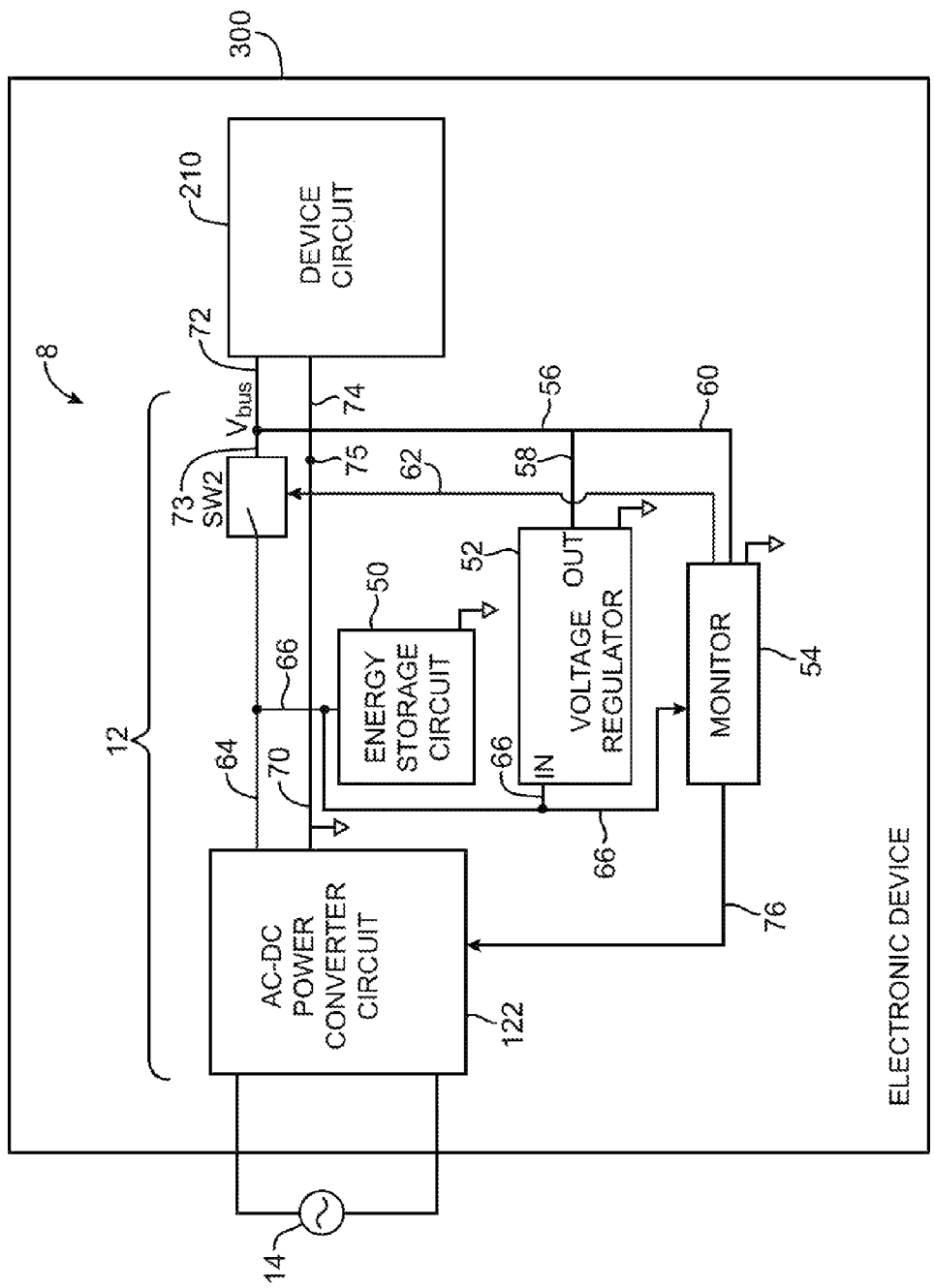
FIG. 8 is a diagram of an electronic device showing how a monitor circuit may be powered by an energy storage circuit to detect power supply changes in a power supply line within the electronic device in accordance with an embodiment of the present invention.

As shown in FIG. 8, the circuitry of system 8 may be incorporated into all or part of an electronic device such as device 300. Device 300 may be a portable computer, a handheld computing device, a desktop computer, consumer electronics equipment such as a television or stereo system, a computer display, a game controller, or any other suitable electronic equipment. During normal operation, device 300 may be powered by the circuitry of power converter 12. This allows the circuitry of device 300 to be fully powered. Circuit components in device 300 are shown schematically as device circuit 210 in FIG. 8 and may include electronic components such as user interface components (e.g., touch screens, touch pads, mice, keys, buttons, circuitry for receiving wireless user commands such as infrared receiver circuitry that monitors signals from remote controls, radio-frequency wireless communications circuitry that monitors user signals, processing and storage circuitry, sensors, etc.).

Energy storage circuit 50 may be charged during normal operation. When it is desired to conserve power, circuit 122 can be placed in a reduced-power (standby) mode of operation. In standby, device circuit 210 may await activity that indicates that device 300 should resume normal operation. For example, device circuitry 210 may include infrared receiver circuitry or other user input circuitry that monitors user input activity or other suitable events. When a user supplies an infrared command or other activity is detected by device circuit 210, the resulting behavior of device circuit 210 may cause the voltage on line 72 to change. Monitor 54 can sense this change in voltage and may issue a corresponding wake-up command to converter circuit 122 via path 76. Monitor 54 can also periodically awaken converter circuit 122 to replenish energy storage circuit 50, as described in connection with FIG. 1.

Figure 9:
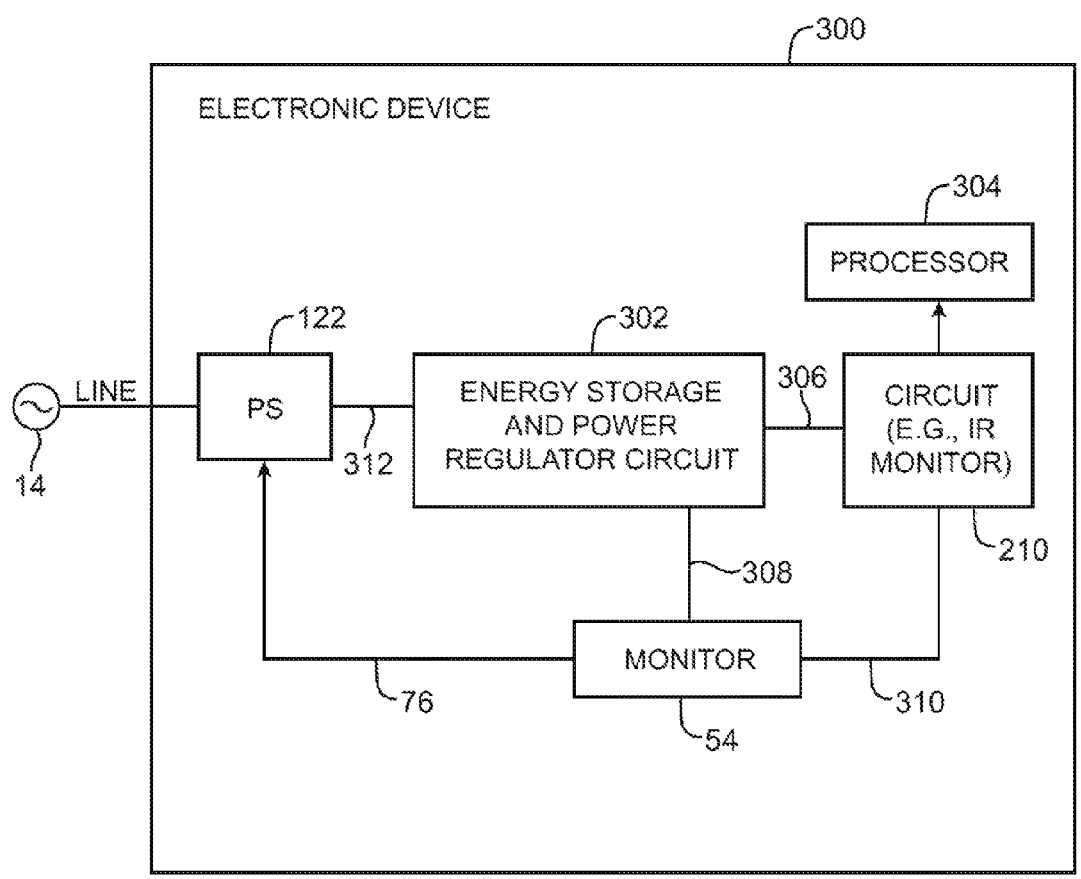
FIG. 9 is a diagram of an electronic device showing how a monitor circuit that is powered by an energy storage circuit may be used to wake up a power supply in the electronic device that has been placed in standby mode in accordance with an embodiment of the present invention.

If desired, circuit 210 can inform monitor 54 that user input or other monitored activity has been detected using other types of signaling schemes. Consider, as an example, the arrangement of FIG. 9. As shown in FIG. 9, electronic device 300 may have a power supply such as an AC-DC power converter circuit 122 that charges energy storage and power (voltage) regulator circuit 302. Circuit 302 may be, for example, a circuit that includes an energy storage circuit such as energy storage circuit 50 of FIG. 8 and that optionally includes a voltage regulator or other circuit that helps regulate the output of the energy storage circuit when powering circuit 210.

Processor 304 may include storage and processing circuitry such as one or more microprocessors and other control circuits (e.g., integrated circuits, etc.). Processor 304 may be used in controlling the operation of device 300 and circuit 210.

During normal operation of device 300 of FIG. 9, power supply 122 may power circuit 302, so the energy storage circuit 302 can be charged. Circuit 210 and processor 304 can be powered and can operate normally. When it is desired to conserve power, power supply 122 may be placed in standby (e.g., by processor 304, monitor 210, or other control circuitry). In standby, the energy storage circuit can be used to power circuit 210 over path 306 and can be used to power monitor 54 over path 308.

Circuit 210 can await user input such as an infrared remote control command or other suitable event that indicates that device 300 should be taken out of standby mode. When such an event is detected, circuit 210 can inform monitor 54 of the occurrence of the event by sending signals over path 310. Path 310 can be an analog or digital path having one or more associated lines for conveying communications between circuit 210 and monitor 54.

Once monitor 54 determines that it is appropriate to wake up power supply 122 to handle the user input command or other event, monitor 54 can issue an appropriate wake-up control command for power supply circuit 122 over path 76. Monitor 54 can also periodically wake up power supply 122 when it is desired to replenish the energy storage circuit in energy storage and power regulator circuit 302 via path 210.

Figure 10:
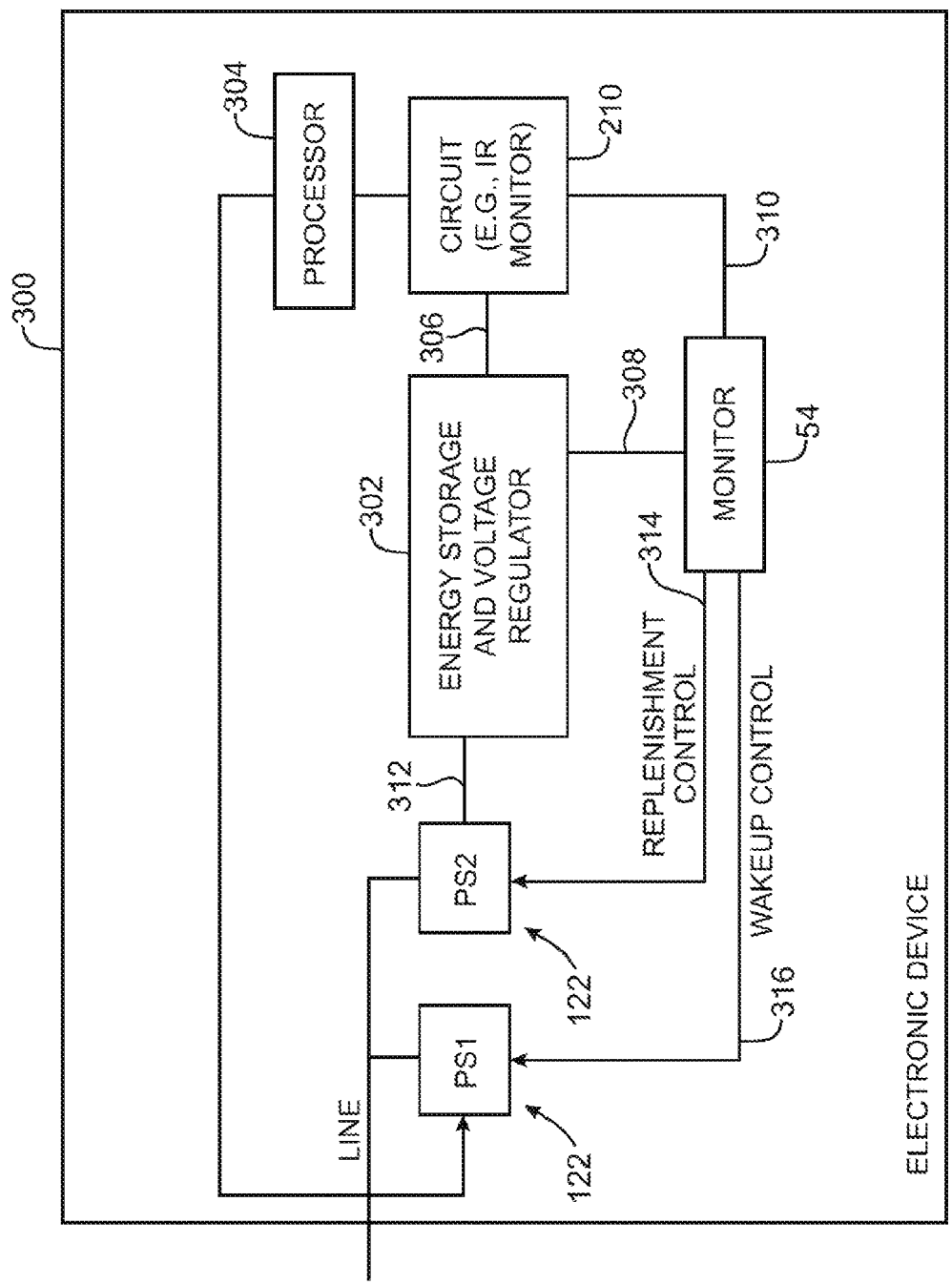
FIG. 10 is a diagram of an electronic device having first and second power supplies showing how a monitor circuit that is powered by an energy storage circuit may be used in controlling the first and second power supplies in accordance with an embodiment of the present invention.

FIG. 10 shows how device 300 may have multiple power supply circuits 122. In the FIG. 10 example, device 300 has power supply circuit PS1 and power supply circuit PS2. Power supply PS1 may be a high-power (primary) power supply that supplies tens or hundreds of watts of power, and power supply PS2 may be a low-power (secondary) power supply that supplies less power (e.g., ten or fewer watts of power). In standby, each supply may consume only a fraction (e.g., 1-10%) of its active power capacity (as an example). These are merely illustrative examples. Primary supply PS1 and secondary supply PS2 may have any suitable power supply capacities if desired.

During normal operation, power supply PS1 may be in its active state and may supply power to circuit 210, processor 304 and other components in device 300. To conserve power, power supply PS1 may be placed in a low-power standby state when full power is not needed. Likewise, power supply PS2 can be placed in standby to conserve power when active operation is not required. During standby, energy storage and voltage regulator circuit 302 may supply power to circuit 210, as described in connection with FIG. 9. From time to time, the energy storage circuit in circuitry 302 may need to be replenished. As described in connection with the circuit of FIG. 1, monitor 54 can monitor the state of the energy storage circuit. When replenishment is desired, monitor 54 can issue a replenishment control signal to power supply PS2 over path 314. In response, power supply PS2 can awaken from its standby state. Because power supply PS2 uses less energy than power supply PS1 and because the entire device 300 need not be powered during replenishment operations with power supply PS2, the use of power supply PS2 to replenish the energy storage circuit while power supply PS1 remains in standby can help conserve power.

If circuit 210 detects user input or other activity that indicates that device 300 should enter its active state, circuit 210 can direct monitor 54 to wake up power supply PS1 via path 316. Monitor 54 can also awaken power supply PS2. If desired, circuit 210 can also use processor 304 to issue wakeup commands and other control commands. Processor 304 may, for example, wake up power supply PS1 whenever user input is received with circuit 210, whereas monitor 54 may be used in waking up power supply PS2 (as an example).

Figure 11:
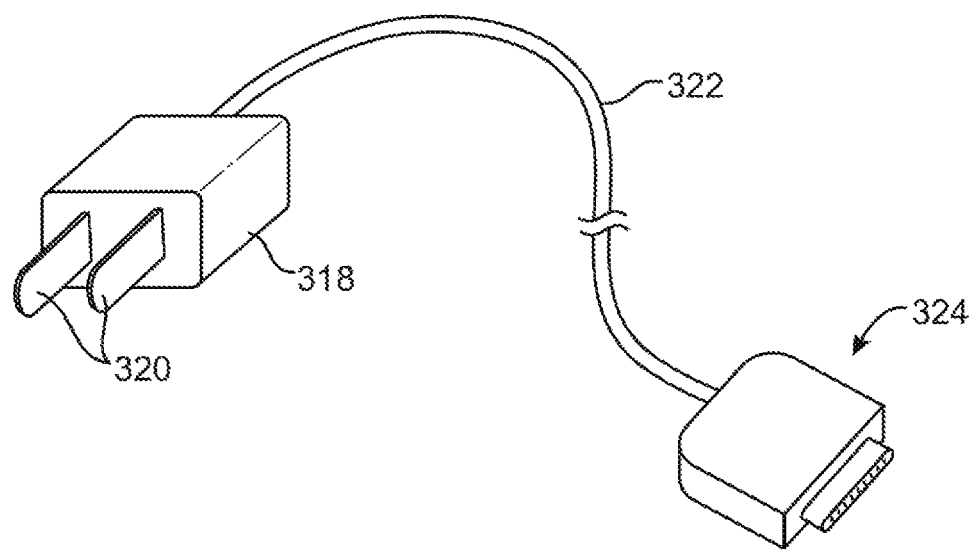
FIG. 11 is a diagram of an illustrative power adapter housing configuration that may be used for power adapter circuitry of the type shown in FIG. 1 in accordance with an embodiment of the present invention.

An illustrative configuration for power adapter 12 such as power adapter 12 of FIG. 1 is shown in FIG. 11. As shown in FIG. 11, the power adapter may have a housing such as housing 318 in which circuitry such as circuitry 12 of FIG. 1 may be mounted. Conductive prongs 320 may be used to connect the power adapter to AC line power. Cable 322 may be used to route output signals from adapter 12 to connector 324. Connector 324 may be used to connect the power adapter to electronic device 10. Connector 324 may be, for example, a 30-pin connector of the type that is sometimes used in coupling music player and telephone devices to computers and power supplies. Connector 324 may, in general, have any suitable number of contacts. The use of a 30-pin arrangement is merely illustrative.

Figure 12:
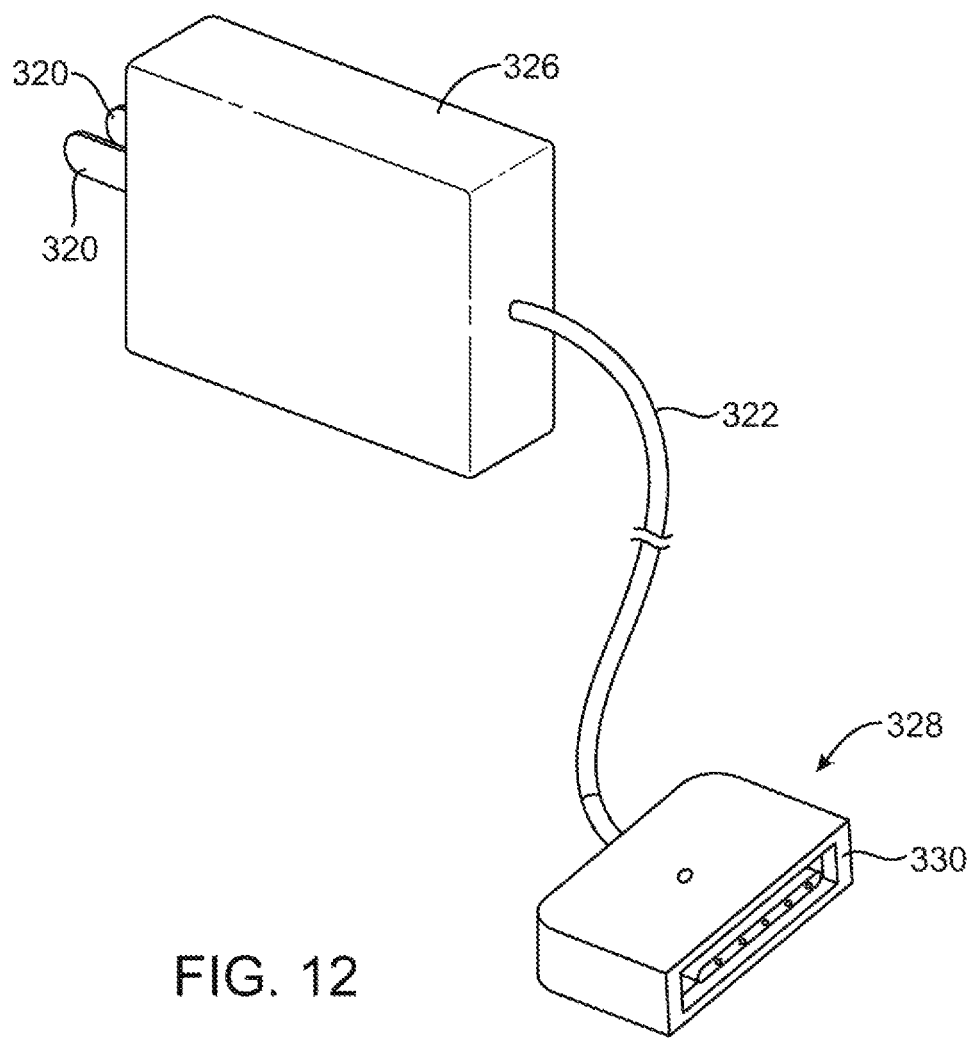
FIG. 12 is a diagram of an illustrative power adapter housing configuration that may be used for power adapter circuitry of the type shown in FIG. 1 and that may have a magnetic attachment mechanism in accordance with an embodiment of the present invention.

FIG. 12 shows another illustrative power adapter arrangement. In the configuration of FIG. 12, power adapter circuitry 12 of FIG. 1 is mounted within housing 326. Connector 328 in the FIG. 12 example may be a magnetic connector such as a MagSafe® connector from Apple Inc. of Cupertino, Calif. This type of connector uses magnet attraction to help secure connector 328 to a mating device. There may be, for example, magnets in portions 330 of connector 328. Plug type connectors may also be used in power adapter 12 if desired.

Figure 13:
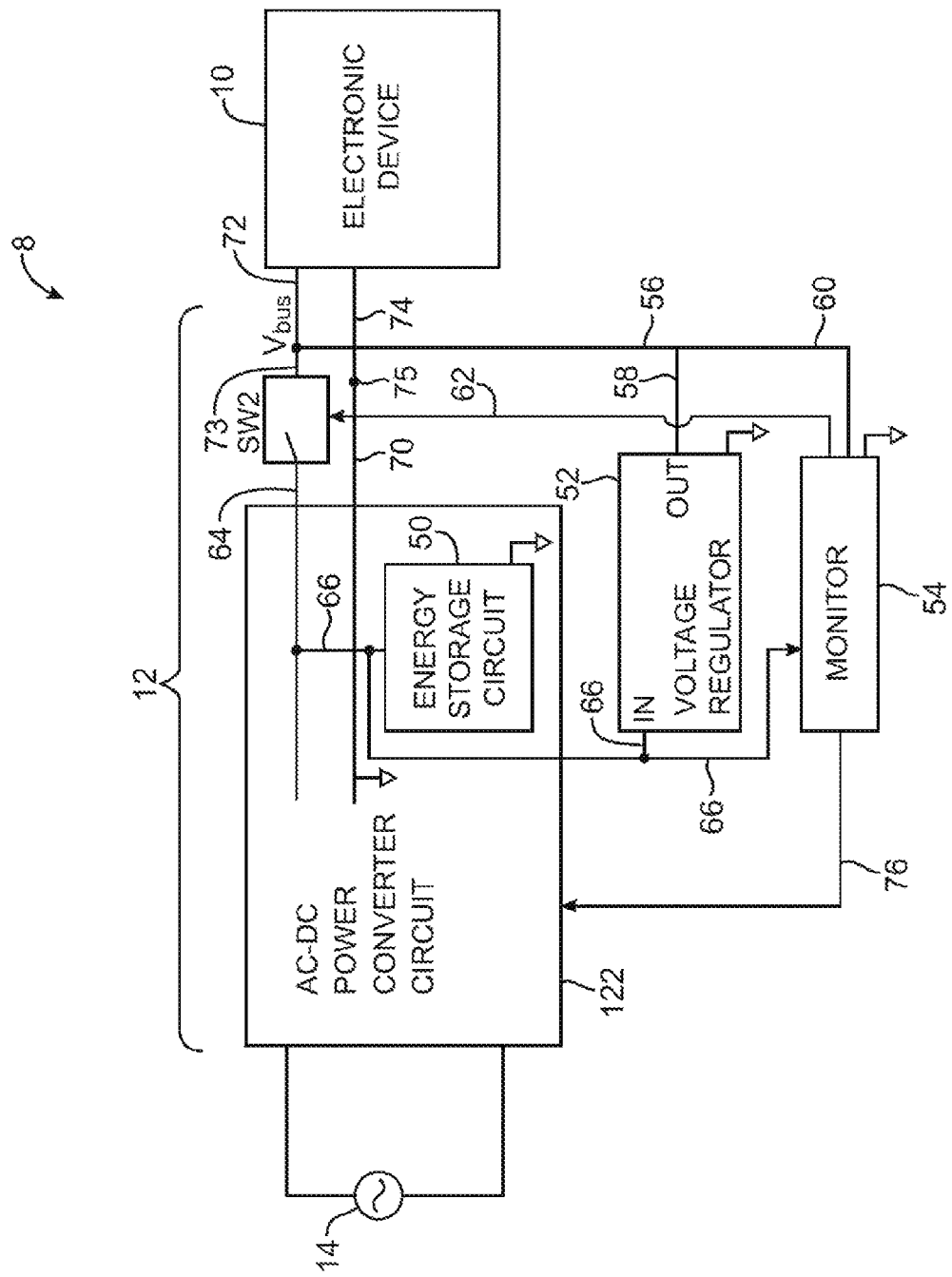
FIG. 13 is a diagram showing how a power converter circuit output capacitor may be used as an energy storage device to power a monitor circuit in accordance with an embodiment of the present invention.

As shown in FIG. 13, energy storage circuit 50 may form part of AC-DC power converter circuit 122. For example, converter circuit 122 may be a converter circuit of the type that has a capacitor across its positive and ground output lines (e.g., for filtering). In this type of arrangement, energy for powering monitor 54 and for powering circuits such as circuit 210 (device 10 in the FIG. 13 example) may be stored within this filter capacitor, without the need for additional energy storage devices. In general, energy storage circuit 50 may be formed from any number of suitable components (capacitors, batteries, etc.) and these components may form stand-alone circuits or may be combined into other circuits in system 8 if desired. Examples such as the illustrative configuration of FIGS. 1 and 13 are merely illustrative.

The foregoing is merely illustrative of the principles of this invention and various modifications can be made by those skilled in the art without departing from the scope and spirit of the invention.

What is claimed is:

1. An electronic device, comprising:
    an energy storage element coupled to an output line;
    a power converter circuit that is operable in a normal mode in which a direct-current voltage is produced on the output line from an alternating-current voltage and that is operable in a standby mode in which the direct-current voltage is not produced;
    circuitry coupled to the output line that is powered by power received from the power converter circuit during the normal mode;
    monitor circuitry operable to monitor a voltage of the output line and operable to control the power converter circuit based at least partly on the monitored voltages;
    a voltage regulator that receives an energy storage element voltage from the energy storage element and that provides a modified version of the energy storage element voltage on a voltage regulator output during the standby mode; and
    a path that electrically couples the voltage regulator output to the output line.

2. The electronic device defined in claim 1 further comprising:
    a switch coupled to the energy storage element, wherein the monitor circuitry is configured to control the switch based at least partly on the monitored voltage.

3. The electronic device defined in claim 2 wherein the switch is interposed between the energy storage element and the circuitry.

4. The electronic device defined in claim 3 wherein the switch is interposed between the power converter circuit and the circuitry.

5. The electronic device defined in claim 4 wherein the monitor circuitry is further operable to control the switch to selectively disconnect the circuitry from the power converter circuit based at least partly on the monitored voltage.

6. The electronic device defined in claim 1 wherein the circuitry includes at least one user interface component operable to monitor user activity.

7. The electronic device defined in claim 6 wherein the circuitry is configured to modify the voltage of the output line based at least partly on the monitored user activity.

8. The electronic device defined in claim 7 wherein the at least one user interface component comprises an infrared receiver.

9. The electronic device defined in claim 7 wherein the at least one user interface component comprises a radio-frequency receiver.

10. The electronic device defined in claim 1 wherein the energy storage element is configured to provide power to the monitor circuitry during the standby mode.

11. The electronic device defined in claim 10 wherein the monitor circuitry is configured to periodically control the power converter circuit to replenish the energy storage element during the standby mode.

12. The electronic device defined in claim 6 wherein the at least one user interface component includes a component selected from the group consisting of: a touch screen, a touch pad, a mouse, a key, a button, infrared receiver circuitry, radio-frequency wireless communications circuitry, processing and storage circuitry, and a sensor.

13. An electronic device, comprising:
    a first power supply circuit that produces a direct-current voltage from an alternating-current voltage, wherein the first power supply circuit is operable in an active mode in which the direct-current voltage is being produced and is further operable in a standby mode in which the direct-current voltage is not produced;
    an energy storage element that produces an energy storage element voltage; and
    circuitry operable to receive the direct-current voltage from the first power supply circuit during the active mode and operable to receive the energy storage element voltage from the energy storage element during the standby mode, wherein the circuitry is further operable to monitor user activity and control the first power supply circuit based at least partly on the monitored user activity, and wherein the circuitry is configured to determine when an output voltage of the energy storage element falls below a predetermined threshold and is further configured to wake up a second power supply circuit to replenish the energy storage element without waking up the first power supply circuit.

14. The electronic device defined in claim 13 wherein the circuitry comprises:
   infrared receiver circuitry operable to monitor user activity by receiving infrared signals that identify whether the first power supply circuit should be operated in the active mode or the standby mode.

15. The electronic device defined in claim 13 wherein the circuitry comprises:
   radio-frequency receiver circuitry operable to monitor user activity by receiving radio-frequency signals that identify whether the first power supply circuit should be operated in the active mode or the standby mode.

16. The electronic device defined in claim 13 wherein the circuitry comprises:
   a device circuit operable to receive user input and produce a corresponding output signal on a communications path; and
   a monitor circuit coupled to the communications path, wherein the monitor circuit is operable to receive the output signal over the communications path and further operable to control the first power supply circuit based on the received output signal.

17. An electronic device, comprising:
   a first power converter circuit configured to convert alternating current power to direct current power;
   a second power converter circuit configured to convert alternating current power to direct current power;
   an energy storage element; and
   circuitry operable to:
      receive an energy storage element voltage from the energy storage element when the first and second power converter circuits are placed in a standby state to conserve power;
      monitor user activity; and
      control the first and second power converter circuits based at least partly on the monitored user activity,
   wherein the circuitry is configured to determine when the energy storage element is depleted and is further configured to wake up the second power converter circuit to replenish the energy storage element without waking up the first power converter circuit.

18. The electronic device defined in claim 17, wherein the circuitry comprises infrared receiver circuitry operable to receive user input, wherein the circuitry is further operable to control the first and second power converter circuits based at least partly on the user input received by the infrared receiver circuitry.

* * * * *

UNITED STATES PATENT AND TRADEMARK OFFICE
CERTIFICATE OF CORRECTION

PATENT NO.       : 8,687,392 B2                                         Page 1 of 1
APPLICATION NO.  : 13/424033
DATED            : April 1, 2014
INVENTOR(S)      : Nicholas A. Sims et al.

It is certified that error appears in the above-identified patent and that said Letters Patent is hereby corrected as shown below:

In the Claims

Column 16, line 9, Claim 1: replace "voltages" with --voltage--.

Signed and Sealed this
Twelfth Day of August, 2014

Michelle K. Lee
*Deputy Director of the United States Patent and Trademark Office*